(12) United States Patent
Mizutani et al.

(10) Patent No.: US 7,846,247 B2
(45) Date of Patent: Dec. 7, 2010

(54) INK SET FOR INK JET RECORDING AND INK JET RECORDING METHOD

(75) Inventors: Michinari Mizutani, Kawasaki (JP); Mikio Sanada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/037,246

(22) Filed: Feb. 26, 2008

(65) Prior Publication Data

US 2008/0213493 A1  Sep. 4, 2008

(30) Foreign Application Priority Data

Mar. 1, 2007 (JP) .............................. 2007-051884

(51) Int. Cl.
*C09D 11/02* (2006.01)
(52) U.S. Cl. .................................. 106/31.6; 106/31.27
(58) Field of Classification Search ................. 106/31.6
See application file for complete search history.

(56) References Cited

U.S. PATENT DOCUMENTS

| | | | |
|---|---|---|---|
| 5,451,251 A | 9/1995 | Mafune et al. | 106/22 H |
| 5,571,313 A | 11/1996 | Mafune et al. | 106/22 H |
| 5,911,815 A | 6/1999 | Yamamoto et al. | 106/31.27 |
| 6,027,210 A | 2/2000 | Kurabayashi et al. | 347/100 |
| 6,062,674 A | 5/2000 | Inui et al. | 347/43 |
| 6,174,354 B1 | 1/2001 | Takizawa et al. | 106/31.43 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,425,662 B1 | 7/2002 | Teraoka et al. | 347/100 |
| 6,511,534 B1 | 1/2003 | Mishina et al. | 106/31.33 |
| 6,706,105 B2 | 3/2004 | Watanabe et al. | 106/31.6 |
| 7,005,461 B2 | 2/2006 | Sanada et al. | 523/160 |
| 7,160,376 B2 | 1/2007 | Watanabe et al. | 106/31.89 |
| 7,276,110 B2 | 10/2007 | Tsujimura et al. | 106/31.27 |
| 7,276,112 B2 | 10/2007 | Tokuda et al. | 106/31.6 |
| 7,347,890 B2 | 3/2008 | Nito et al. | 106/31.27 |
| 7,371,274 B2 | 5/2008 | Sanada et al. | 106/31.27 |

(Continued)

FOREIGN PATENT DOCUMENTS

CN  1295100 A  5/2001

(Continued)

OTHER PUBLICATIONS

Jul. 10, 2008 European Search Report in European Patent Appln. No. 08152057.9.

(Continued)

*Primary Examiner*—Jessica L Ward
*Assistant Examiner*—Veronica Faison Gee
(74) *Attorney, Agent, or Firm*—Fitzpatrick, Cella, Harper & Scinto (57) ABSTRACT

An ink set for ink jet recording includes a black ink and a plurality of color inks of different colors. The black ink contains a pigment as a coloring material. The color ink having the highest brightness among the plurality of color inks has the highest surface tension among the plurality of color inks. The difference in surface tension between the black ink and the color ink having the highest brightness is 2 dyn/cm (mN/m) or less.

9 Claims, 7 Drawing Sheets

U.S. PATENT DOCUMENTS

| | | | |
|---|---|---|---|
| 2004/0035323 A1 | 2/2004 | Suzuki et al. | 106/31.65 |
| 2004/0119801 A1 | 6/2004 | Suzuki et al. | 347/100 |
| 2004/0257420 A1 | 12/2004 | Ichizawa et al. | 347/100 |
| 2005/0263035 A1 | 12/2005 | Jung et al. | 106/31.58 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0135647 A1 | 6/2006 | Ichinose et al. | 523/160 |
| 2007/0252868 A1 | 11/2007 | Sanada et al. | 347/33 |
| 2007/0252881 A1 | 11/2007 | Sanada et al. | 347/100 |
| 2008/0018722 A1 | 1/2008 | Mafune et al. | 347/100 |

FOREIGN PATENT DOCUMENTS

| | | |
|---|---|---|
| JP | 60-197778 | 10/1985 |
| JP | 2000-198955 | 7/2000 |

OTHER PUBLICATIONS

May 6, 2010 Chinese Official Action in Chinese Patent Application No. 200810082351.6 (with translation).

YELLOW PRINTING REGION
BLACK PRINTING REGION

INK SET FOR INK JET RECORDING AND INK JET RECORDING METHOD

BACKGROUND OF THE INVENTION

1. Field of the Invention

The present invention relates to an ink set for ink jet recording, the ink set including a black ink and a plurality of color inks, and to an ink jet recording method.

2. Description of the Related Art

One of the methods for recording characters and images known in the art is an ink jet recording method in which characters and images are formed on a recording medium with inks ejected onto the recording medium through nozzles of a recording head. In order to improve the print quality in the ink jet recording method, various techniques have been employed. One of such techniques is to use inks having permeability suitable for ink jet recording.

For example, there is known an ink jet recording method in which inks that have a low permeation rate on recording paper, i.e., a recording medium, are used so that the amount of ink adhering on the surface and the nearby part of the surface of the recording medium is large, and so that the density and sharpness of the characters and drawings can be improved. An ink that has a low permeation rate and mostly remains on the surface of the recording medium is generally called "low-permeability ink," whereas an ink that has a high permeation rate is called "super-permeability ink."

Figure 5A:
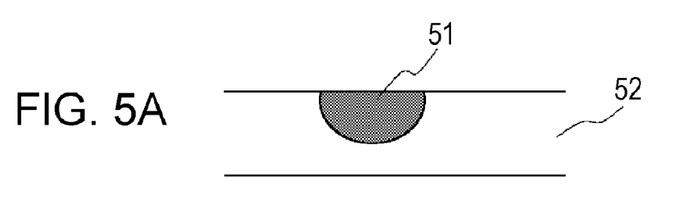
FIGS. 5A to 5C are diagrams showing how ink droplets are applied according to a related ink jet recording method.

As illustrated in FIG. 5A, in the cases where a super-permeability ink having high permeability is used, an ink 51 permeates into the interior of a recording medium 52 immediately after the ink 51 is ejected onto the recording medium 52, and the amount of the ink 51 remaining on the surface is small. The rate of permeation of the ink 51 into the recording medium 52 is high, and the ink 51 may reach as far as the rear surface of the recording medium 52, depending on the permeability and other characteristics of the material of the recording medium 52.

An ink that quickly permeates into a recording medium as soon as the ink lands on the recording medium rarely mixes with other inks on the recording medium. Thus, such an ink is advantageous in that bleeding at the boundary regions of different colors can be suppressed. However, since the ink deeply permeates into the recording medium and diffuses over a wide range, coloring components of the dye or pigment become diffused. Moreover, since light that is incident on the recording medium is reflected at a deep position with respect to the surface of the recording medium, the density of the recorded image tends to be low. Furthermore, the ink 51 may diffuse widely in all directions, resulting in an excessive increase in size of the recording dot, and whisker-like bleeding (feathering) may occur around the edge of the dot, resulting in an image with a blurred contour.

Figure 5B:
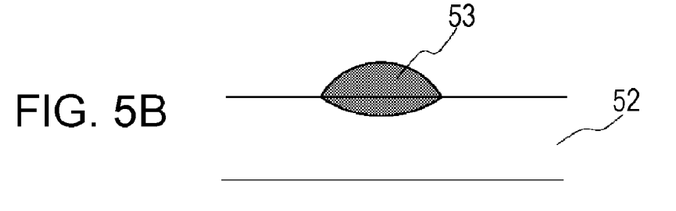

In contrast, as illustrated in FIG. 5B, when a low-permeability ink 53 having low permeability is used, the low-permeability ink 53 remains protruding on the surface of the recording medium 52, and the components of the ink such as a solvent can easily evaporate under such a condition. Thus, the amount of low-permeability ink 53 permeating into the recording medium 52 in the thickness direction is small.

When the amount of ink remaining on the recording medium surface is large, the density of the image tends to be high. Moreover, since the amount of ink diffusing into the recording medium in one dot is significantly lower than in the case of a super-permeability ink, a low-permeability ink can record sharp images. However, the rate of permeation of this type of ink into the recording medium is low, and the time required for the ink on the recording medium surface to fix is long. Thus, when other inks are ejected onto nearby positions, flow-out of inks occurs between the inks. Thus, bleeding occurs in the boundary portion between different colors, and the image quality tends to be low.

It has been a wide practice up to the present to use a poorly permeable ink as a black ink and highly permeable inks as inks of other colors. A black ink is usually used for recording letters and drawings, minute lines and points of which must be clearly drawn and which must be easily recognizable. Thus, a low-permeability ink that can achieve high recording density and can record sharp contours has been used as a black ink. In recording a color image in which dots of different colors are usually disposed next to one another, super-permeability inks that can record sharp boundaries and that can suppress bleeding in the boundary regions between different colors have been used.

Figure 5C:
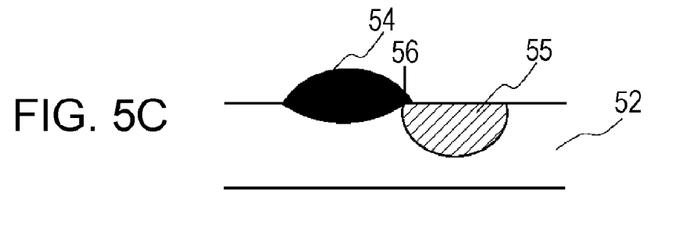

However, although different inks with different permeability have been used as a black ink and color inks to comply with different requirements for characteristics of images to be recorded, the following problems have occurred. As shown in FIG. 5C, when a black dot 54 of an ink having low permeability is adjacent to a color dot 55 of an ink having high permeability, flow-out may occur between the adjacent dots, thereby degrading the recording quality. In the black dot 54, the ink protruding from the recording medium surface flows out from a boundary portion 56 into the color dot 55, resulting in a decrease in density in the boundary portion 56 at the black dot side. As a result, the density of the contour of the black dot decreases, and a whitish blurred image is produced (undertrapping). In the color dot, the black ink mixes in the boundary portion 56, and the contour becomes unclear (bleeding). This case illustrates that when inks with different permeabilities are adjacent to each other, undertrapping or bleeding may occur in the boundary portion 56, and the quality of recording tends to be low. These phenomena are particularly frequent when recording of images is conducted at a high speed.

Many methods for preventing bleeding have been proposed. For example, Japanese Patent Laid-Open No. 60-197778 discloses a method in which inks having substantially the same surface tension (30 dyn/cm (mN/m) or more and 60 dyn/cm (mN/m) or less at 20° C.) are used as the color inks for forming color images. However, it has been difficult to obtain an image with sufficient optical density by using the inks, particularly the black ink, disclosed in Japanese Patent Laid-Open No. 60-197778. Moreover, since bleeding cannot be sufficiently prevented, the quality of the image is poor. Another concern is that there are many types of standard recording paper depending on region and manufacturer. It is desirable for the density of the black image and the sharpness at the edge portions to be high regardless of the type of paper that is used.

Japanese Patent Laid-Open No. 2000-198955 discloses a technique for improving the quality of the image formed by a black ink and preventing bleeding between a color image and a black image by using a salt-containing, self-dispersion pigment ink as the black ink. However, since ever higher speed and higher image quality are in demand, it is desirable to suppress bleeding at a higher level even when the time difference in printing between the black ink and other color inks is small.

Another available technique involves leaving the recording medium and the black ink ejected on the medium to stand for a time long enough to allow the ink, particularly a poorly permeable ink, to fix on the recording medium to an extent sufficient to prevent bleeding. However, according to this technique, a significantly large time difference must be provided between printing with the black ink and printing with the color inks. The technique thus has a low throughput and is not suitable for high-speed recording.

Another proposed technique involves decreasing (reduction of) the amount of ink supplied in one scanning operation and repeating scanning at predetermined time intervals (multipass printing). However, in multipass printing, the number of times of scanning operations is increased and the printing time per sheet (throughput) can be very long if the scanning intervals are large. Another concern is that a fixing unit including a heater for forcibly evaporating the ink is sometimes used. If the fixing unit is to be included, the size of the apparatus increases, and there is also a disadvantage of uneconomical energy consumption.

SUMMARY OF THE INVENTION

The present invention provides an ink set for ink jet recording that can create sharp images with suppressed undertrapping and bleeding at the boundaries between a color ink and a black ink even when the time difference between application of one ink and application of the other ink is small. An ink jet recording method that involves using such an ink set for ink jet recording is also provided.

An aspect of the present invention provides an ink set for ink jet recording that includes a black ink and a plurality of color inks of different colors, the black ink containing a pigment as a coloring material. The color ink having the highest brightness among the plurality of color inks has the highest surface tension among the plurality of color inks. The difference in surface tension between the black ink and the color ink having the highest brightness is 2 dyn/cm (mN/m) or less.

The color ink having the highest brightness may be a yellow ink. The pigment contained in the black ink may be a self-dispersion carbon black. The black ink may contain at least one salt selected from the group consisting of $(M1)_2SO_4$, $CH_3COO(M1)$, $Ph\text{-}(COO(M1))_n$, $(M1)NO_3$, $(M1)Cl$, $(M1)Br$, $(M1)I$, $(M1)_2SO_3$, and $(M1)_2CO_3$, where M1 represents an alkali metal, ammonium, or organic ammonium, Ph represents a benzene ring, and n represents 1 or 2. The difference in surface tension between the color ink having the highest brightness and a color ink having the lowest brightness may be 4 dyn/cm (mN/m) or less. The surface tension of the black ink may be 39 dyn/cm (mN/m) or more and 40 dyn/cm (mN/m) or less. Moreover, the surface tension of the yellow ink may be lower than the surface tension of the black ink.

Another aspect of the present invention provides an ink jet recording method using the above-described ink set. The method includes applying the black ink and one of the plurality of color inks on a recording medium so that the black ink contacts the one color ink.

In the ink jet recording method, one of the black ink and the one color ink may be ejected before the other, and the one ejected before the other may remain as a liquid on the recording medium at the time of contact between the black ink and the color ink on the recording medium. The black ink and the color ink may be applied on the recording medium at an interval of 1 second or less.

The ink set for ink jet recording and the ink jet recording method described above can create sharp images with suppressed undertrapping at the boundaries between a color ink and a black ink even when the time difference between application of one ink and application of the other ink is small. Moreover, the optical density of black in the images is high, and images with high sharpness can be obtained. Furthermore, bleeding at the boundary between the color ink and the black ink is suppressed, and images with high sharpness can be obtained.

Further features of the present invention will become apparent from the following description of exemplary embodiments with reference to the attached drawings.

DESCRIPTION OF THE EMBODIMENTS

The present invention will now be described in detail below by way of embodiments. An ink set according to an embodiment includes a black ink and a plurality of color inks. This ink set effectively prevents color bleeding between an ink of a color having the lowest brightness and an ink of a color having the highest brightness, feathering, and the like. The type or number of inks constituting the ink set is not particularly limited. For example, the ink set may include a yellow ink, a cyan ink, a magenta ink, and a black ink.

Given a set of inks in a typical ink set, bleeding at the boundaries is most noticeable between the ink of a color having the highest brightness and the ink of a color having the lowest brightness among inks contained in the ink set. Furthermore, the color bleeding that occurs at the boundary of these two colors is highly distinctive. This distinctive and noticeable color bleeding can be effectively prevented according to the first embodiment of the present invention.

Typically, in a full color ink set containing yellow, cyan, magenta, and black inks, the ink with the lowest brightness is the black ink. In an ink set including three colors, namely, yellow, cyan, and magenta, the color having the highest brightness is the yellow ink and the color having the lowest brightness is the cyan ink.

The viscosity of the black ink in the ink set of this embodiment is 1 cp (mPa·s) or more and 10 cp (mPa·s) or less and can be 1.5 cp (mPa·s) or more and 5 cp (mPa·s) or less. When this condition is satisfied, the black ink can be stably ejected from the ink jet nozzles at a high frequency. The surface tension of the black ink is 35 dyn/cm (mN/m) or more, can be 38 dyn/cm (mN/m) or more, and particularly can be 39 dyn/cm (mN/m) or more to obtain high-quality images. The surface tension of the black ink can be 40 dyn/cm (mN/m) or less.

The viscosity of the color inks constituting the ink set of this embodiment can be 1 cp (mPa·s) or more and, in particular, can be 1.5 cp (mPa·s) or more. The viscosity of the color inks can be 10 cp (mPa·s) or less and, in particular, can be 5 cp (mPa·s) or less. When these conditions are satisfied, the color inks can be stably ejected from the ink jet nozzles at a high frequency. Occurrence of bleeding in the boundary regions between adjacent different color images degrades the quality of the multicolor image. Thus, the surface tension of the color ink can be 40 dyn/cm (mN/m) or less. To improve ejection property of the ink, the surface tension of the color ink may be 28 dyn/cm (mN/m) or more.

As described above, increasing the surface tension of the black ink enhances the quality of printed characters. However, to improve the image uniformity obtained when using primary and secondary colors, it is effective to decrease the surface tension of the color inks. The present inventors have found that because the yellow ink has a high brightness, the image uniformity obtained when using primary or secondary colors does not degrade even when the surface tension of the yellow ink is increased to a level comparable to that of the black ink. The surface tension of the cyan and magenta inks having lower brightness than the yellow ink can be 38 dyn/cm (mN/m) or less to achieve high image uniformity.

In recording images or the like by using the ink set of this embodiment, one droplet of the ejected black ink can weigh 30 ng or less and one droplet of the ejected color ink can weigh 15 ng or less. When adjacent pixels are printed during high-speed printing using inks having high surface tensions, two ink droplets unite with each other and the ink may overflow from the pixels, thereby degrading the sharpness of the image. When the amount of one ink droplet is excessively large, the time taken for the ink droplet to dry tends to be long, and image quality is likely to be low. However, when the amount of each ink droplet ejected is controlled to be within the above-described ranges during recording, inks dry quickly and a high-density, high-quality image can be obtained. Thus, the above-described conditions should be satisfied.

In this embodiment, the difference in surface tension between the black ink and color ink significantly differing in brightness can be controlled to be 2 dyn/cm (mN/m) or less. The present inventors have found that when the surface tension of the black ink is substantially the same as the surface tension of the color ink, the occurrence of undertrapping and bleeding can be effectively suppressed. When the surface tension of the black ink, which has the lowest brightness, is controlled to be higher than the surface tension of the color ink having the highest brightness and the difference in surface tension between these inks is adjusted to be 2 dyn/cm (mN/m) or less, particularly favorable effects can be obtained. In other words, the density of the black ink increases, thereby increasing sharpness, and undertrapping and color bleeding between the black ink and the color ink can be suppressed. Furthermore, bleeding between color inks can also be suppressed.

Thus, in this embodiment, the combination of the black ink and the color ink should satisfy the following conditions. First, a pigment ink containing a pigment as a coloring material should be used as the black ink. Second, the surface tension of the color ink used in combination with the black ink and having the highest brightness among the color inks should be higher than the surface tension of other color inks. Third, the difference in surface tension between the black ink and the color ink should be 2 dyn/cm (mN/m) or less.

[Coloring Material in the Black Ink]

A pigment rather than a dye is used as the coloring material of the black ink due to the following reasons. Image forming with dye inks involves permeation of dyes into the interior of the recording medium such that the recording medium itself is colored. Accordingly, dyes rarely remain on the surface of the recording medium. In contrast, in image forming with pigment inks, pigment particles, which are much larger than the particles of dyes, remain on the surface of the recording medium and the image is formed by the color of the pigment particles themselves on the surface. After pigment ink lands on the recording medium surface (such as a surface of a regular paper sheet) having a relatively high permeability, the solvent in the ink starts to evaporate. During evaporation, the dispersion becomes unstable and solid-liquid separation is accelerated, thereby producing aggregates of pigment particles. Since the black ink has a high surface tension and a low permeability as described above, the density of the pigment that stays on and is affixed onto the recording medium is high when the black ink alone is applied on the recording medium. Thus, an optical density higher than that achieved with a dye black ink can be obtained. Once the black ink and the color ink are ejected on the recording medium, solid-liquid separation is accelerated and pigment particles form aggregates, thereby preventing the color ink from penetrating into the black ink. Moreover, when the surface tension of the color ink is substantially the same as the surface tension of the black ink, inks on the recording medium move very little. Thus, penetrations of the color ink into the black ink are effectively suppressed. The above-described findings were made in studies conducted by the present inventors.

An example of the pigment contained in the black ink is carbon black. The carbon black in the ink can be of a self-dispersive type. An example of a self dispersion carbon black is a carbon black having at least one hydrophilic group (anionic group or cationic group) serving as an ionic group bonded to the surface of the carbon black either directly or via another atomic group. A self dispersion carbon black achieves good dispersibility without the need to add a dispersant for dispersing the carbon black. Furthermore, by using a self dispersion carbon black in an ink, aggregation of the ink ejected onto a recording medium can be easily controlled and bleeding can be easily suppressed. Thus, bleeding can be further suppressed when the self dispersion carbon black is used in the ink set.

In the cases in which a carbon black having an anionic group bonded to the surface either directly or via another atomic group is used, the hydrophilic group bonded to the surface may be —COO(M2), —SO$_3$(M2), —PO$_3$H(M2), —PO$_3$(M2)$_2$, or the like, where M2 represents a hydrogen atom, an alkali metal, ammonium, or organic ammonium. Among the carbon blacks of this type, a self dispersion carbon black having —COO(M2) or —SO$_3$(M2) bonded to the carbon black surface so that the carbon black is anionically charged has excellent dispersibility in the ink, and thus can be used in this embodiment.

Specific examples of the alkali metal represented by (M2) in the hydrophilic group include lithium, sodium, potassium, rubidium, and cesium. Specific examples of the organic ammonium include monomethylammonium, dimethylammonium, trimethylammonium, ethylammonium, diethylammonium, triethylammonium, monomethanolammonium, dimethanolammonium, and trimethanolammonium.

The ink containing a self dispersion carbon black containing ammonium or organic ammonium as (M2) can improve water resistance of recorded images. This is presumably because once the ink is applied on the recording medium, ammonium is decomposed and ammonia is evaporated. The following processes are available for producing a self dispersion carbon black containing ammonium as (M2). For example, there is a process of converting a self dispersion carbon black containing an alkali metal as (M2) by an ion exchange technique so that the (M2) is converted to ammonium. Alternatively, an acid may be added to produce an H-type, and then ammonium hydroxide may be added to convert (M2) to ammonium. An example of the process for producing an anionically charged self dispersion carbon black is a process involving oxidizing carbon black with sodium hypochlorite. A —COONa group can be chemically bonded on the carbon black surface by this process.

As for cationically charged carbon blacks, the hydrophilic group bonded to the surface either directly or via another atomic group may be, for example, at least one quaternary ammonium group selected from the group consisting of:

In the formulate above, R represents a linear or branched C1-C12 alkyl group, a substituted or unsubstituted phenyl group, or a substituted or unsubstituted naphthyl group. Of note is that $NO_3^-$ or $CH_3COO$, for example, exists as the counter ion of the cationic group. The process for producing a cationically charged self dispersion carbon black including the hydrophilic group described above bonded on the surface is as follows. For example, in order to have an N-ethylpyridyl group represented by bonded on the surface, a method of treating the carbon black with 3-amino-N-ethylpyridinium bromide is used.

A carbon black anionically or cationically charged by introduction of a hydrophilic group into the carbon black surface has excellent water dispersibility due to ionic repulsion. Thus, such a carbon black maintains a stable dispersed state in an aqueous ink without the need to add a dispersant or the like. The hydrophilic groups described above may be bonded directly on the surface of the carbon black. Alternatively, another atomic group may be interposed between the carbon black surface and the hydrophilic group such that the hydrophilic group is indirectly bonded to the carbon black surface.

Examples of the other atomic group include linear or branched C1-C12 alkylene groups, substituted or unsubstituted phenylene groups, and substituted or unsubstituted naphthylene groups. Examples of the substituents of the phenylene and naphthylene groups include linear or branched C1-C6 alkyl groups. Examples of the combination of the hydrophilic group and the atomic group include —$C_2H_4COOM$, -Ph-$SO_3M$, -Ph-$(COOM)_m$, and the like (where Ph represents a benzene ring and m represents 1 or 2). In these formulas, M represents a hydrogen atom, an alkali metal, ammonium, or organic ammonium as with (M2) described above.

Two or more types of self dispersion carbon blacks described above may be adequately selected for use as coloring materials for the ink. The self dispersion carbon black content in the ink can be 0.1 percent by mass or more or 1 percent by mass or more of the entire mass of the ink, and can be 15 percent by mass or less and particularly can be 10 percent by mass or less. When these conditions are satisfied, the self-dispersive carbon blacks can maintain a satisfactory dispersed state in the ink. A dye may also be added as a coloring material in addition to the self dispersion carbon blacks to adjust the color tone of the ink.

Salt Contained in the Black Ink

At least one selected from $(M1)_2SO_4$, $CH_3COO(M1)$, Ph-$(COO(M1))_n$, $(M1)NO_3$, $(M1)Cl$, $(M1)Br$, $(M1)I$, $(M1)_2SO_3$, and $(M1)_2CO_3$ can be used as the salt contained in the black ink of this embodiment. Here, M1 represents an alkali metal, ammonium, or organic ammonium, Ph represents a benzene ring, and n represents 1 or 2. The salt content can be 0.05 percent by mass or more or 10.0 percent by mass or more with respect to the total mass of the ink. At a salt content below 0.05 percent by mass, images with high optical density may not always be obtained. At a salt content exceeding 10.0 percent by mass, storage stability of the ink and other properties may not be satisfactory.

Specific examples of the alkali metal include lithium, sodium, potassium, rubidium, and cesium. Specific examples of the organic ammonium include monomethylammonium, dimethylammonium, trimethylammonium, monoethylammonium, diethylammonium, triethylammonium, monomethanolammonium, dimethanolammonium, trimethanolammonium, monoethanolammonium, diethanolammonium, and triethanolammonium.

Solvent in Black Ink

Examples of the ink solvent or dispersion medium in the black ink include water and mixtures of water and water-soluble organic solvents. Examples of the water-soluble organic solvents include C1-C4 alkyl alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones and ketoalcohols such as acetone and diacetone alcohol; ethers such as tetrahydrofuran and dioxane; polyalkylene glycols such as polyethylene glycol and polypropylene glycol having an average molecular weight of about 200 to about 2,000; alkylene glycols having C2-C6 alkylene groups, such as ethylene glycol, propylene glycol, butylene glycol, triethylene glycol, 1,2,6-hexanetriol, thiodiglycol, hexylene glycol, and diethylene glycol; alkyl ether acetates such as polyethylene glycol monomethyl ether acetate; glycerol; alkyl ethers of polyalcohols such as ethylene glycol monomethyl (or ethyl) ether, diethylene glycol methyl(or ethyl) ether, and triethylene glycol monomethyl(or ethyl) ether; and N-methyl-2-pyrrolidone, 2-pyrrolidone, and 1,3-dimethyl-2-imidazolidinone.

The water-soluble organic solvent content in the ink is not particularly limited and can be in a range of 3 percent by mass to 50 percent by mass relative to the total mass of the ink. The water content in the ink can be in a range of 50 percent by mass to 95 percent by mass relative to the total mass of the ink. The viscosity and surface tension of the black ink may be adjusted to improve ejection property. The surface tension of the black ink can be improved by, for example, adding a surfactant. Any suitable surfactant may be used. Examples of the surfactant include anionic surfactants such as ethylene oxide adducts of alcohols, ethylene oxide adducts of alkylphenols, ethylene oxide-propylene oxide copolymers, and ethylene oxide adducts of acetylene glycol.

Other Components in the Ink

The ink may contain, in addition to the above-described components, a moisturizing solid component such as urea, a urea derivative, trimethylol propane, or trimethylol ethane. The moisturizing solid component content in the ink can be 0.1 percent by mass or more and 20.0 percent by mass or less and in particular, can be 3.0 percent by mass or more and 10.0 percent by mass or less relative to the total mass of the ink.

Coloring Materials in Color Inks

Common dyes and pigments may be used as the coloring materials in the color inks. Examples of the dyes include acidic dyes and direct dyes. For example, an existing anionic dye or a novel anionic dye may be used. Any dye having appropriate color tone and density may be used. Two or more of such dyes may be used in combination. Specific examples of the anionic dyes are as follows.

[Yellow Coloring Materials]
C.I. Direct Yellow 8, 11, 12, 27, 28, 33, 39, 44, 50, 58, 85, 86, 87, 88, 89, 98, 100, 110, and 132; C.I. Acid Yellow 1, 3, 7, 11, 17, 23, 25, 29, 36, 38, 40, 42, 44, 76, 98, and 99; C.I. Reactive Yellow 2, 3, 17, 25, 37, and 42; and C.I. Food Yellow 3

[Red Coloring Materials]
C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, and 230; C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, and 289; C.I. Reactive Red 7, 12, 13, 15, 17, 20, 23, 24, 31, 42, 45, 46, and 59; C.I. Food Red 87, 92, and 94

[Blue Coloring Materials]
C.I. Direct Blue 1, 15, 22, 25, 41, 76, 77, 80, 86, 90, 98, 106, 108, 120, 158, 163, 168, 199, and 226; C.I. Acid Blue 1, 7, 9, 15, 22, 23, 25, 29, 40, 43, 59, 62, 74, 78, 80, 90, 100, 102, 104, 117, 127, 138, 158, and 161; C.I. Reactive Blue 4, 5, 7, 13, 14, 15, 18, 19, 21, 26, 27, 29, 32, 38, 40, 44, and 100

[Black Coloring Materials]
C.I. Direct Black 17, 19, 22, 31, 32, 51, 62, 71, 74, 112, 113, 154, 168, and 195; C.I. Acid Black 2, 48, 51, 52, 110, 115, and 156; C.I. Food Black 1 and 2

The coloring material content in the color ink used in this embodiment may be adequately adjusted so that the ink can be ejected properly during ink jet recording and so that the ink achieves the desired color tone and density. For example, the coloring material content relative to the total mass of the ink can be 3 percent by mass or more and 50 percent by mass or less. Since the image density may become non-uniform depending on the order in which the inks are applied, the coloring material content can be 10 percent by mass or less relative to the total mass of the color ink including the coloring material.

Organic Pigments

Examples of the organic pigments include insoluble azo pigments such as toluidine red, toluidine maroon, hansa yellow, benzidine yellow, and pyrazolone red; soluble azo pigments such as Lytol red, Helio Bordeaux, pigment scarlet, and permanent red 2B; vat dye derivatives such as alizarin, indanthrone, and thioindigo maroon, and phthalocyanine pigments such as phthalocyanine blue and phthalocyanine green; quinacridone pigments such as quinacridone red and quinacridone magenta, perylene pigments such as perylene red and perylene scarlet, and isoindolinone pigments such as isoindolinone yellow and isoindolinone orange; imidazolone pigments such as benzimidazolone yellow, benzimidazolone orange, and benzimidazolone red, and pyranthrone pigments such as pyranthrone red and pyranthrone orange; thioindigo pigments, condensed azo pigments, diketopyrrolopyrrole pigments, flavanthrone yellow, acylamido yellow, quinophthalone yellow, nickel azo yellow, copper azomethine yellow, and perinone orange; and anthrone orange, dianthraquinonyl red, and dioxazine violet.

Examples of the organic pigments are indicated by color index (C.I.) numbers as follows:
C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Of these pigments, the following are favored: C.I. Pigment Yellow 74, 93, 97, 110, 120, 128, 138, 147, 148, 150, 151, 154, 180, and 185; C.I. Pigment Red 122; C.I. Pigment Violet 19; and C.I. Pigment Blue 15, 15:1, 15:3, and 15:4.

Solvent or Dispersion Medium in the Color Ink

Examples of the ink solvent or dispersion medium in the color ink include water and mixtures of water and water-soluble organic solvents. The same water-soluble organic solvents described above in the description of the black ink may be used as the water-soluble organic solvents. The water-soluble organic solvent content in the ink is not particularly limited and can be 3 percent by mass or more relative to the total mass of the ink. The water-soluble organic solvent in the ink can be 50 percent by mass or less. The water content in the ink can be 50 percent by mass or more relative to the total mass of the ink. The water content can be 95 percent by mass or less. In order to apply the color ink on a recording medium by an ink jet technique (e.g., bubble jet (registered trade name)), the viscosity and surface tension of the ink may be adjusted so that the ink can be ejected properly. The surface tension of the color ink can be improved by, for example, adding a surfactant. Any suitable surfactant may be used. Examples of the surfactant include anionic surfactants such as ethylene oxide adducts of alcohols, ethylene oxide adducts of alkylphenols, ethylene oxide-propylene oxide copolymers, and ethylene oxide adducts of acetylene glycol.

Other Components in the Color Ink

As with the black ink, the color ink may contain, in addition to the above-described components, a moisturizing solid component such as urea, a urea derivative, trimethylol propane, or trimethylol ethane. The moisturizing solid component content in the ink can be 0.1 percent by mass or more, in particular, can be 3.0 percent by mass or more. The moisturizing solid component content can be 20.0 percent by mass or less and in particular, can be 10.0 percent by mass or less relative to the total mass of the ink.

Structure of Recording Head and Printing Method

A structure of a recording head and a printing method of this embodiment will now be described with reference to FIGS. 2A to 2C.

Figure 2A:
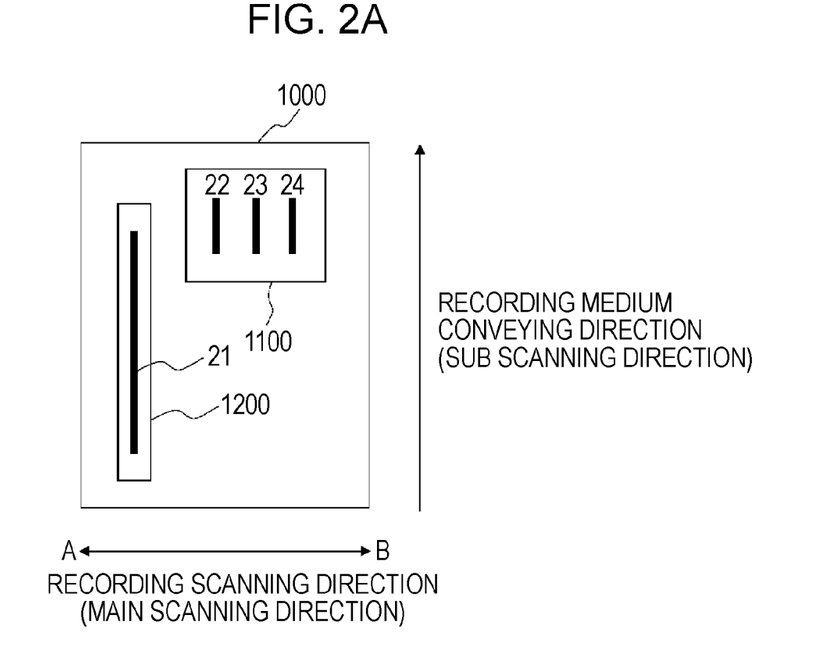
FIGS. 2A to 2C are diagrams each showing the arrangement of a color chip and a black chip in an ink jet recording head used in embodiments.
Figure 2B:
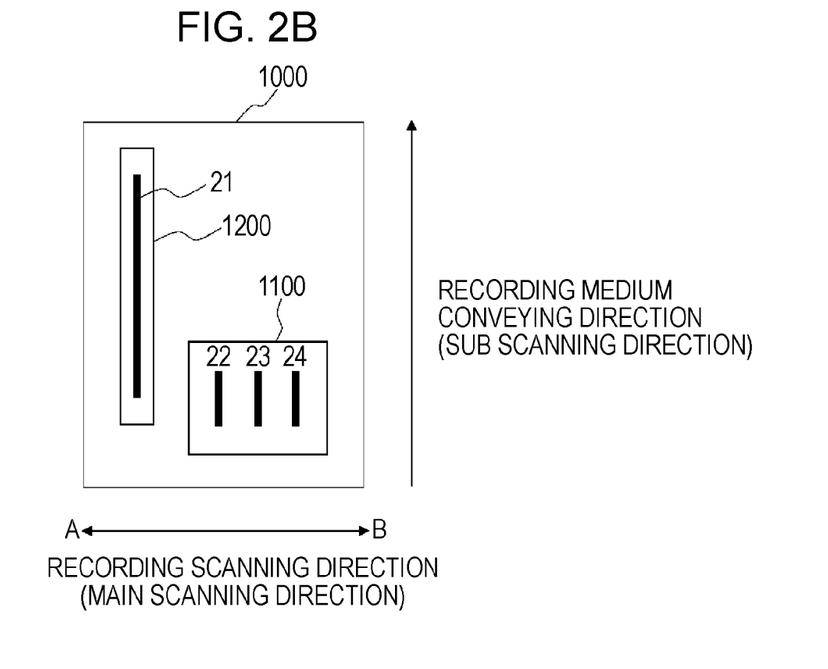

FIG. 2A is a schematic diagram showing the arrangement of recording chips of a recording head mounted on a printer as viewed from the recording medium side. As shown in the drawing, the recording head includes a substrate 1000 and a color ink chip 1100 and a black ink chip 1200 that are connected to the substrate 1000. The color ink chip 1100 includes a cyan ink ejection orifice row 22, a magenta ink ejection orifice row 23, and a yellow ink ejection orifice row 24 for ejecting color inks. The black ink chip 1200 includes an ejection orifice row 21 for ejecting a black ink. The black ink chip 1200 is longer than the color ink chip 1100 in the recording medium conveying direction (sub scanning direction). That is, the range of the black ink chip 1200 where the ejection orifices are aligned is longer than that of the color ink chip 1100. Moreover, the ejection orifice row 21 of the black ink chip 1200 is displaced from the orifice rows 22 to 24 of the color ink chip 1100 in the sub scanning direction by a predetermined distance.

As shown in FIG. 2A, the black ink chip 1200 is longer than the color ink chip 1100 in the recording medium conveying direction (sub scanning direction), i.e., has a longer ejection orifice row. This is to improve the recording speed during recording of documents or the like using the black ink chip. When the ejection orifice row of the black ink chip 1200 is long in the sub scanning direction, the length of the recording range in one scanning operation in the sub scanning direction becomes larger than that of the recording range of the color chip 1100.

In order to conduct recording with the black ink before the color inks are applied onto the same recording region of the recording medium, the color ink chip 1100 is displaced from the black ink chip 1200 in the recording medium conveying direction, as shown in FIG. 2A. In particular, each color ink ejection orifice row of the color ink chip 1100 is disposed such that its end at the downstream side in the conveying direction is located downstream of the downstream end of the ejection orifice row 21 of the black ink chip 1200 in the conveying direction. This structure creates a certain time difference between recording with the black ink ejected from the black ink chip 1200 and recording with the color inks ejected from the color ink chip 1100. The time difference can be 1 second or less. (If a large time difference is set in order to allow the black ink to sufficiently permeate into the recording medium, the throughput decreases and high-speed recording is no longer possible.) Alternatively, as shown in FIG. 2B, the recording head may be configured such that recording with color inks is performed before recording with the black ink. In such a case as well, the time difference between the recordings can be 1 second or less.

When the time difference is equal to the length of time required for one scan operation of the recording head, the printing method is called "1-scan delay printing." In the case in which the recording head shown in FIG. 2A is used, the recording head scans in a direction perpendicular to the recording medium conveying direction so as to increase the efficiency of printing.

Figure 2C:
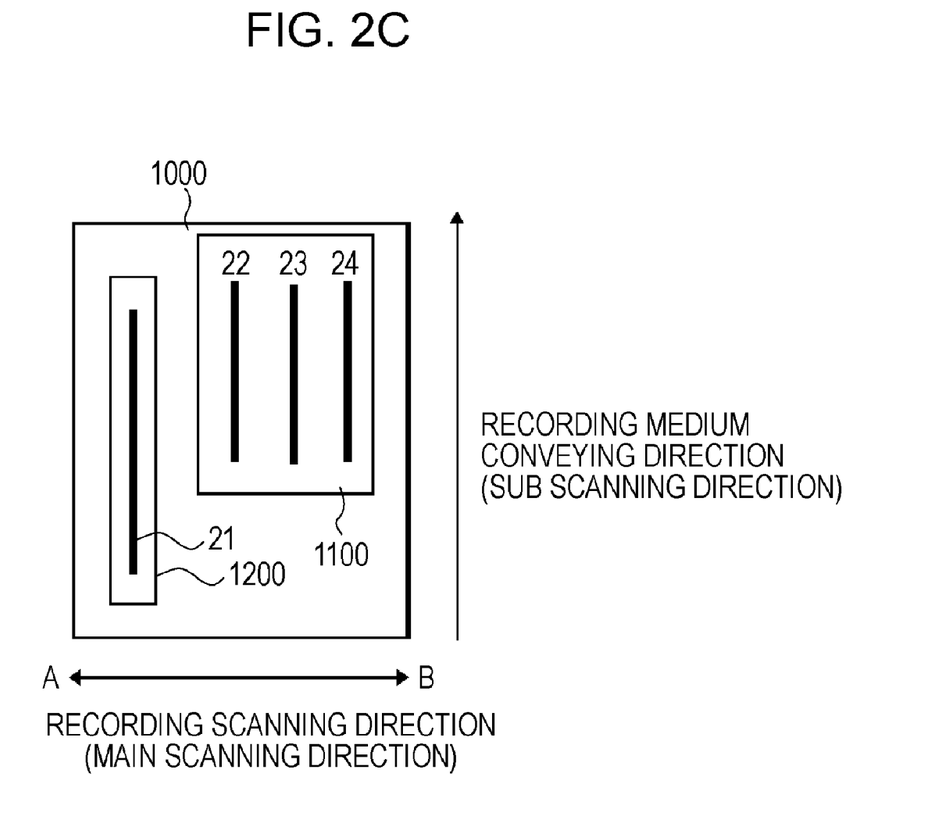

In contrast, a recording head shown in FIG. 2C includes a color ink chip 1100 with color ink ejection orifice rows elongated in the recording medium conveying direction (sub scanning direction) so that a larger number of ejection orifices can be arranged in the color ink chip 1100 and the speed of color printing can be increased. The ejection orifice row 21 for ejecting the black ink is displaced from the position of the ejection orifice rows 22 to 24 of the color ink chip 1100 by a predetermined distance in the sub scanning direction. The overlap between the ejection orifice row 21 of the black ink chip 1200 and each of the ejection orifice rows 22, 23, and 24 of the color ink chip 1100 is larger than that in the recording head shown in FIG. 2A.

With a recording head in which the overlap between the ejection orifice row of the black ink and the ejection orifice rows of the color ink is large, as shown in FIG. 2C, more efficient recording is possible. In the case in which recording is conducted by using the overlapping portion between the ejection orifice row of the black ink and the ejection orifice rows of the color ink, it is possible to simultaneously conduct recording with the black ink and recording with the color ink on the same recording region of the recording medium in one recording operation. The structure illustrated in FIG. 2C includes a large number of nozzles and can improve printing efficiency. According to this method, recording with a black ink and color inks is conducted on the same recording region of the recording medium in one scanning operation. Thus, the time difference between recording with the black ink ejected from the black ink chip 1200 and recording with the color inks from the color ink chip 1100 is extremely small. Moreover, the order in which the black ink and the color inks are applied on the recording medium is reversed depending on the direction of scanning for recording. Such a printing method is called "zero-scan delay printing." In the case in which the recording head shown in FIG. 2C is used, the recording head scans in a direction perpendicular to the recording medium conveying direction such that printing efficiency is improved.

EXAMPLES

Examples and Comparative Examples, which will now be described, should not be read as limiting the scope of the present invention. In the following description, "part" or "%" is on a mass basis unless otherwise noted. The total of the components in an ink is 100 parts. Acetylenol EH (trade name, produced by Kawaken Fine Chemicals, Co., Ltd.) in the composition is an acetylene glycol-ethylene oxide adduct.

| | |
|---|---|
| Black self-dispersion pigment dispersion (trade name: CABOJET 300 produced by Cabot Corporation) | 50 parts |
| Ammonium sulfate | 1 part |
| Trimethylolpropane | 5 parts |
| Glycerol | 5 parts |
| 2-Pyrrolidone | 5 parts |
| Acetylenol EH | 0.24 parts |
| Water | Balance |

Each of the color inks was respectively prepared by mixing and dissolving the following components by thorough stirring and then pressure-filtrating the resultant solution through a micro filter (produced by FUJIFILM Corporation) having a pore size of 0.2 μm.

Yellow Ink 1: Y1

| | |
|---|---|
| Acetylenol EH | 0.2 parts |
| Trimethylolpropane | 5 parts |
| Glycerol | 5 parts |
| 2-Pyrrolidone | 5 parts |

-continued

| | |
|---|---|
| C.I. Direct Yellow 86 | 5 parts |
| Water | Balance |

Magenta Ink 1: M1

| | |
|---|---|
| Acetylenol EH | 0.5 parts |
| Trimethylolpropane | 5 parts |
| Glycerol | 5 parts |
| 2-Pyrrolidone | 5 parts |
| C.I. Acid Red 289 | 5 parts |
| Water | Balance |

Cyan Ink 1: C1

| | |
|---|---|
| Acetylenol EH | 0.3 parts |
| Trimethylolpropane | 5 parts |
| Glycerol | 5 parts |
| 2-Pyrrolidone | 5 parts |
| C.I. Acid Blue 9 | 5 parts |
| Water | Balance |

Yellow Pigment Ink 4: Y4

| | |
|---|---|
| Yellow self-dispersion pigment dispersion (trade name: CABOJET 270 produced by Cabot Corporation) | 50 parts |
| Trimethylolpropane | 5 parts |
| Glycerol | 5 parts |
| 2-Pyrrolidone | 5 parts |
| Acetylenol EH | 0.8 parts |
| Water | Balance |

Cyan Pigment Ink 4: C4

| | |
|---|---|
| Cyan self-dispersion pigment dispersion (trade name: CABOJET 250 produced by Cabot Corporation) | 50 parts |
| Trimethylolpropane | 5 parts |
| Glycerol | 5 parts |
| 2-Pyrrolidone | 5 parts |
| Acetylenol EH | 1 part |
| Water | Balance |

Magenta Pigment Ink 4: M4

| | |
|---|---|
| Magenta self-despersion pigment dispersion (trade name: CABOJET 260 produced by Cabot Corporation) | 50 parts |
| Trimethylolpropane | 5 parts |
| Glycerol | 5 parts |
| 2-Pyrrolidone | 5 parts |
| Acetylenol EH | 1.2 parts |
| Water | Balance |

Examples

Ink Set 1

The surface tension γ of each of the black and color inks prepared as described above was measured with a CBVP-series surface tensiometer A-1 (produced by Kyowa Interface Science Co., Ltd.). In particular, 5 ml to 6 ml of a measuring object, i.e., an ink, was placed in a petri dish and measurement was conducted at a set temperature of 25±0.2° C. The types and observed surface tensions of the four inks constituting Ink set 1 were as follows:

Black ink 1 (Bk1): 40 dyn/cm (mN/m)
Yellow ink 1 (Y1): 40 dyn/cm (mN/m)
Cyan ink 1 (C1): 36 dyn/cm (mN/m)
Magenta ink (M1): 36 dyn/cm (mN/m)

<Ink Set 2>

Ink set 2 included four inks described below. Black ink 2 (Bk2), Yellow ink 2 (Y2), and Cyan ink 2 (C2) were prepared by changing the amount of Acetylenol EH in Black ink 1 (Bk1), Yellow ink 1 (Y1), and Cyan ink 1 (C1) prepared as described above, respectively, so that the surface tension of each ink was as follows:

Black ink 2 (Bk2): 39 dyn/cm (mN/m)
Yellow ink 2 (Y2): 37 dyn/cm (mN/m)
Cyan ink 2 (C2): 34 dyn/cm (mN/m)
Magenta ink 2 (M2): The same as Magenta ink 1 (M1) in Ink set 1

<Ink Set 3>

Ink set 3 included the following inks:
Black ink 3 (Bk3): 35 dyn/cm (mN/m)
Yellow ink 3 (Y3): The same as Yellow ink 2 (Y2) in Ink set 2
Cyan ink 3 (C3): The same as Cyan ink 2 (C2) in Ink set 2
Magenta ink 3 (M3): 34 dyn/cm (mN/m)

Black ink 3 was prepared by changing the amount of Acetylenol EH contained in Black ink 1 described above so that the surface tension was the above-described value. Magenta ink 3 was prepared by changing the amount of Acetylenol EH contained in Magenta ink 1 described above so that the surface tension was the above-described value.

<Ink Set 4>

Ink set 4 included the following inks:
Black ink 4 (Bk4): 35 dyn/cm (mN/m)
Yellow ink 4 (Y4): 33 dyn/cm (mN/m)
Cyan ink 4 (C4): 30 dyn/cm (mN/m)
Magenta ink 4 (M4): 30 dyn/cm (mN/m)

Black ink 4 was prepared by changing the amount of Acetylenol EH in Black ink 1 so that the surface tension was the above-described value. Yellow ink 4, Cyan ink 4, and Magenta ink 4 were respectively prepared by changing the amount of Acetylenol EH contained in Yellow ink 1, Cyan ink 1, and Magenta ink 1 described above so that the surface tensions were the above-described values.

Comparative Examples

Ink Set 5

Ink set 5 included the following inks:
Black ink 5 (Bk5): 41 dyn/cm (mN/m)
Yellow ink 5 (Y5): 36 dyn/cm (mN/m)
Cyan ink 5 (C5): The same as Cyan ink 1 (C1) in Ink set 1
Magenta ink 5 (M5): The same as Magenta ink 1 (M1) in Ink set 1

Black ink 5 was prepared by changing the amount of Acetylenol EH in Black ink 1 so that the surface tension was the above-described value. Yellow ink 5 was prepared by changing the amount of Acetylenol EH in Yellow ink 1 so that the surface tension was the above-described value.

<Ink Set 6>
Ink set 6 included the following inks:
Black ink 6 (Bk6): 36 dyn/cm (mN/m)
Yellow ink 6 (Y6): 39 dyn/cm (mN/m)
Cyan ink 6 (C6): 34 dyn/cm (mN/m)
Magenta ink 6 (M6): The same as Magenta ink 1 (M1) in Ink set 1

Black ink 6 was prepared by changing the amount of Acetylenol EH in Black ink 1 so that the surface tension was the above-described value. Yellow ink 6 was prepared by changing the amount of Acetylenol EH in Yellow ink 1 so that the surface tension was the above-described value. Cyan ink 6 was prepared by changing the amount of Acetylenol EH in Cyan ink 1 so that the surface tension was the above-described value.

<Ink Set 7>
Ink set 7 included the following inks:
Black ink 7 (Bk7): The same as Black ink 2 (Bk2) in Ink set 2
Yellow ink 7 (Y7): 42 dyn/cm (mN/m)
Cyan ink 7 (C7): The same as Cyan ink 2 (C2) in Ink set 2
Magenta ink 7 (M7): The same as Magenta ink 2 (M2) in Ink set 2
Yellow ink 7 was prepared by changing the amount of Acetylenol EH in Yellow ink 1 so that the surface tension was the above-described value.

Inks constituting Ink sets 1 to 7 are summarized in Table 1 below.

tially apply 23 ng of black ink and 12 ng of a color ink in a 1/600 inch×1/600 inch region was used. In evaluating the print produced by zero-scan delay printing, an ink jet recording apparatus (trade name: Pixus ip5200R produced by Canon) modified to substantially apply 23 ng of black ink and 12 ng of a color ink in a 1/600 inch×1/600 inch region was used.

1. Evaluation of Black Ink

Evaluation Criterion Regarding Print Density

Solid printing was conducted on PPC standard paper using the ink jet recording apparatus described above, and the ink was dried at 25° C. for 1 hour. The print density of the resulting print was measured with Macbeth RD918 produced by Macbeth Corporation, and the print density was evaluated according to the following criterion:

A: Average print density of standard paper A, B, C, D, and E was 1.4 or more
B: Average print density of standard paper A, B, C, D, and E was less than 1.4

The standard paper used was as follows:
A: PPC paper Office Planner produced by Canon
B: PPC paper GF-500 produced by Canon
C: PPC paper 4025 produced by Xerox Corporation
D: PPC Prober Bond produced by Fox River Paper Corporation
E: PPC paper Office 80 for Canon produced by Neusiedler

TABLE 1

|  |  |  | Inks | | | |
| --- | --- | --- | --- | --- | --- | --- |
|  |  |  | Black | Yellow | Cyan | Magenta |
| Examples | Ink set 1 | Ink code | BK1 | Y1 | C1 | M1 |
|  |  | Surface tension | 40 | 40 | 36 | 36 |
|  |  | Coloring material | Pigment | Dye | Dye | Dye |
|  | Ink set 2 | Ink code | BK2 | Y2 | C2 | M2 |
|  |  | Surface tension | 39 | 37 | 34 | 36 |
|  |  | Coloring material | Pigment | Dye | Dye | Dye |
|  | Ink set 3 | Ink code | BK3 | Y3 | C3 | M3 |
|  |  | Surface tension | 35 | 37 | 34 | 34 |
|  |  | Coloring material | Pigment | Dye | Dye | Dye |
|  | Ink set 4 | Ink code | BK4 | Y4 | C4 | M4 |
|  |  | Surface tension | 35 | 33 | 30 | 30 |
|  |  | Coloring material | Pigment | Pigment | Pigment | Pigment |
| Comparative Examples | Ink set 5 | Ink code | BK5 | Y5 | C5 | M5 |
|  |  | Surface tension | 41 | 36 | 36 | 36 |
|  |  | Coloring material | Pigment | Dye | Dye | Dye |
|  | Ink set 6 | Ink code | BK6 | Y6 | C6 | M6 |
|  |  | Surface tension | 36 | 39 | 34 | 36 |
|  |  | Coloring material | Pigment | Dye | Dye | Dye |
|  | Ink set 7 | Ink code | BK7 | Y7 | C7 | M7 |
|  |  | Surface tension | 39 | 42 | 34 | 36 |
|  |  | Coloring material | Pigment | Dye | Dye | Dye |

Surface tension: dyn/cm (mN/m)

<Evaluating the Ink Sets>
The ink sets described above were evaluated on the following points according to the method and criteria described below:
1. Print density of black ink
2. Bleeding or undertrapping between black ink and color ink
3. Bleeding between color inks Printing was conducted by 1-scan delay printing and zero-scan delay printing. In evaluating the print produced by 1-scan delay printing, an ink jet recording apparatus (trade name: Pixus 560i produced by Canon) modified to substan- 2. Evaluation of Black Ink and Color Inks
<Bleeding and Undertrapping>

Figure 4:
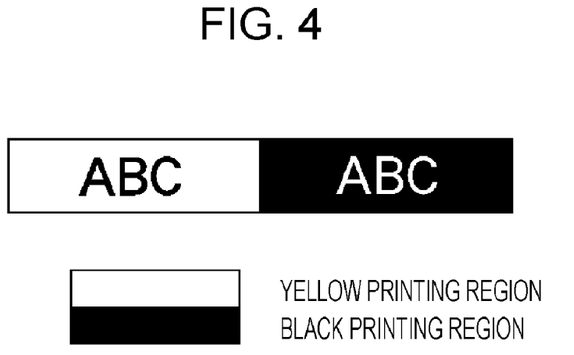
FIG. 4 is a diagram showing a print pattern used in experiments for evaluating bleeding and undertrapping.

A pattern as illustrated in FIG. 4, in which an image region in black was adjacent to an image region in color, was printed, and bleeding at the boundary portion and undertrapping in the black region were visually studied. The recording medium was PPC standard paper, Office Planner produced by Canon.

Evaluation Criterion of Bleeding
A: No bleeding at boundary portion
B: Little bleeding at boundary portion
C: Extensive bleeding at boundary portion Evaluation Criterion of Undertrapping
A: No undertrapping
B: Little undertrapping
C: Extensive undertrapping as a whole 3. Evaluation of Color Inks The same pattern as in FIG. 4 except that the image printed with the black ink was printed with a cyan ink instead was printed such that an image region printed with a yellow ink having a high brightness was adjacent to an image region printed with the cyan ink having a low brightness. The bleeding at the boundary of the two colors was visually studied. The recording medium was PPC standard paper, Office Planner produced by Canon.

Evaluation Criterion of Bleeding
A: No bleeding at boundary portion
B: Little bleeding at boundary portion
C: Extensive bleeding at boundary portion Prints formed by 1-scan delay printing using Ink sets 1 to 4 are indicated as Examples 1 to 4, and prints formed by zero-scan delay printing using Ink sets 1 to 4 are indicated as Examples 5 to 8. Prints formed by 1-scan delay printing by using Ink sets 5 to 7 are indicated as Comparative Examples 1 to 3, and prints formed by zero-scan delay printing by using Ink sets 5 to 7 are indicated as Comparative Examples 4 to 6. Results of each of the above-described evaluations for each of the Examples and Comparative Examples are summarized in Tables 2-1 and 2-2.

TABLE 2-1

|  | Surface tension of Bk ink (mN/m) | Difference in surface tension | |
|---|---|---|---|
|  |  | (1) B/w Bk ink and color ink | (2) B/w color inks |
| Ink set 1 | 40 | 0 | 4 |
| Ink set 2 | 39 | 2 | 3 |
| Ink set 3 | 35 | −2 | 3 |
| Ink set 4 | 35 | 2 | 3 |
| Ink set 5 | 41 | 5 | 0 |
| Ink set 6 | 36 | −3 | 5 |
| Ink set 7 | 39 | −3 | 8 |

Note:
(1): Surface tension of Bk ink − surface tension of a color ink (yellow ink) having highest brightness.
(2) Surface tension of color ink (yellow ink) with highest brightness − surface tension of color ink with lowest surface tension.

The results of Examples 1 to 4 as shown in Table 2-2 indicate that prints formed by 1-scan delay printing by using Ink sets 1 to 4 were excellent in terms of suppressing ink bleeding, suppressing undertrapping, and achieving good print density. As in Examples 1 and 2, when the surface tension of the black ink was high, i.e., 39 dyn/cm (mN/m) to 40 dyn/cm (mN/m), the print density of the black ink was particularly excellent. Of note is that the same effects can be achieved with a recording head including the color ink chip 1100 and the black ink chip 1200 arranged as illustrated in FIG. 2B, in which printing with color inks was performed before printing with a black ink. With the arrangement of the chips shown in FIG. 2B, a certain time difference can be created between recording with color inks ejected from the color ink chip 1100 and recording with the black ink ejected from the black ink chip 1200.

The results of Examples 5 to 8 as shown in the table indicate that the prints formed by using Ink sets 1 to 4 by zero-scan delay printing (in which the time difference between printing with the black ink and printing with the color inks was very small) were excellent in terms of suppressing ink bleeding, suppressing undertrapping, and achieving good print density.

The ink permeation process of Example 1 in which the black ink was applied on the paper before the color inks in 1-scan delay printing will now be described with reference to FIGS. 1A to 1D. In Example 1, the surface tension of Yellow ink 1 (Y1) with the highest brightness was higher than the surface tension of any other color inks. The difference in surface tension between Black ink 1 (Bk1) and Yellow ink 1 (Y1) was 2 dyn/cm (mN/m) or less.

Figure 1A:
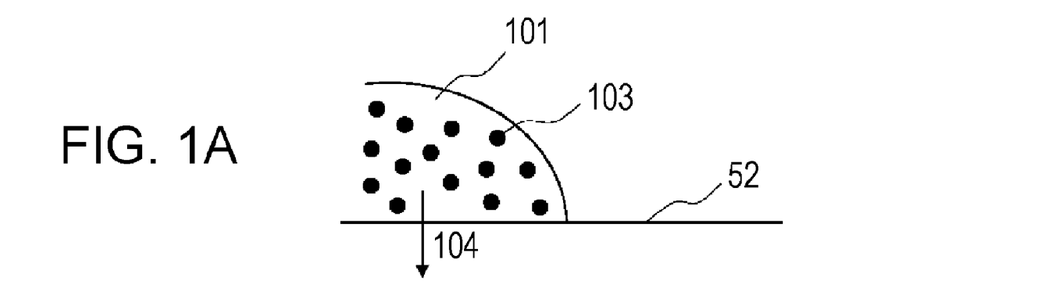
FIGS. 1A to 1C and 1E to 1H are schematic diagrams in chronological order showing permeation processes of black inks and yellow inks of Examples 1 to 4 on a recording medium.
Figure 1B:
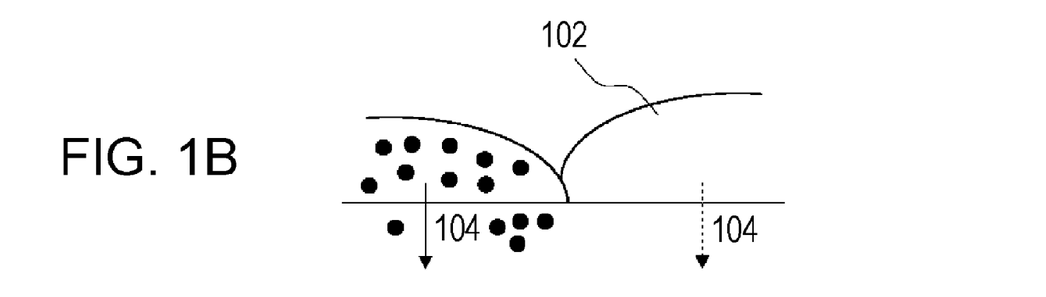

First, a black ink (Bk1) 101 having low permeability covered the recording medium 52 as shown in FIG. 1A. The black ink (Bk1) 101 contained pigment particles 103. Since the black ink (Bk1) 101 has low permeability, the black ink (Bk1) 101 permeated into the recording medium 52 slowly. Subsequently, an yellow ink (Y1) 102 having low permeability was applied (FIG. 1B). Since there was only a small difference in surface tension between the black ink (Bk1) 101 and the yellow ink (Y1) 102, there was substantially no ink movement at the interface between the black ink (Bk1) 101 and the

TABLE 2-2

|  | Ink set | Print Scan delay | density of Bk ink | Evaluation between Bk ink and color ink | | (5) Bleeding between color inks |
|---|---|---|---|---|---|---|
|  |  |  |  | (3) Bleeding | (4) Undertrapping |  |
| Example 1 | 1 | 1 | A | A | A | A |
| Example 2 | 2 | 1 | A | A | A | A |
| Example 3 | 3 | 1 | B | A | A | A |
| Example 4 | 4 | 1 | B | A | A | A |
| Example 5 | 1 | 0 | A | A | A | A |
| Example 6 | 2 | 0 | A | A | A | A |
| Example 7 | 3 | 0 | B | A | A | A |
| Example 8 | 4 | 0 | B | A | A | A |
| Comparative Example 1 | 5 | 1 | A | C | B | A |
| Comparative Example 2 | 6 | 1 | B | B | A | B |
| Comparative Example 3 | 7 | 1 | B | B | A | C |
| Comparative Example 4 | 5 | 0 | A | C | C | A |
| Comparative Example 5 | 6 | 0 | B | C | A | B |
| Comparative Example 6 | 7 | 0 | B | C | A | C |

Figure 1C:
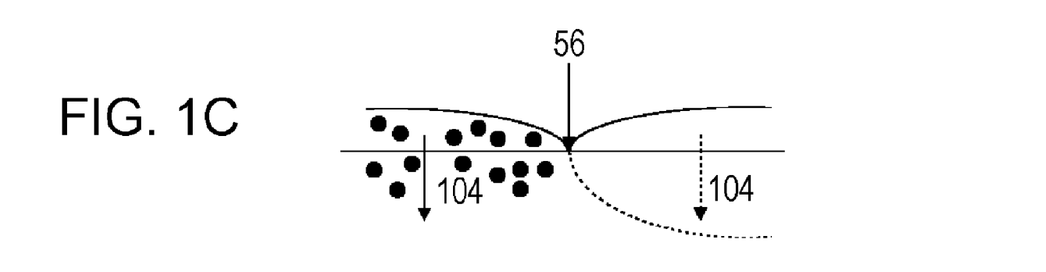

Note:
(3) Bleeding between Bk ink and color ink (yellow ink) with the highest brightness.
(4) Undertrapping between Bk ink and color ink (yellow ink) with the highest brightness.
(5) Bleeding between color ink (yellow ink) with the highest brightness and color ink with the lowest surface tension.

yellow ink (Y1) 102. Thus, it can be assumed that the inks slowly permeated into the recording medium 52 (FIG. 1C).

Figure 1D:
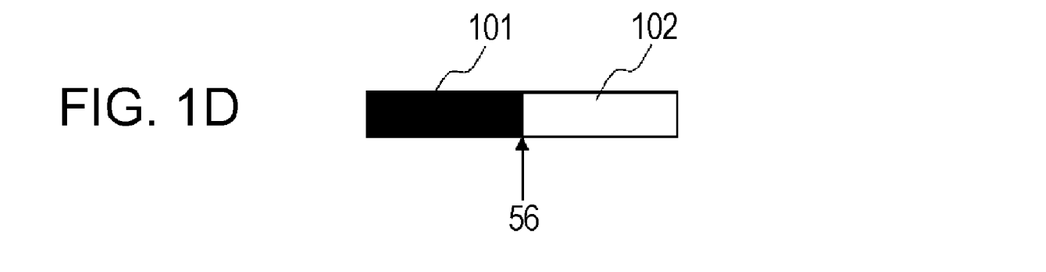
FIGS. 1D and 1I are diagrams showing boundary portions between the black ink and the yellow ink in Examples 1 to 4 as viewed from above the recording medium.

FIG. 1D is a diagram showing the boundary portion 56 between the black ink (Bk1) 101 and the yellow ink (Y1) 102 as viewed from above. Since physical properties of the black ink (Bk1) 101 were substantially the same as that of the yellow ink (Y1) 102, permeation was completed without having the inks, remaining as liquids on the recording medium surface, mixing with each other at the boundary portion 56. The present inventors have analyzed this state and found that it is important to strike a proper balance among the following factors: the permeation rate at which the black ink (Bk1) 101 and the yellow ink (Y1) 102 permeate into the recording medium 52 in a permeation direction 104, the amount of ink droplets, and the surface tension of the inks.

Figure 1E:
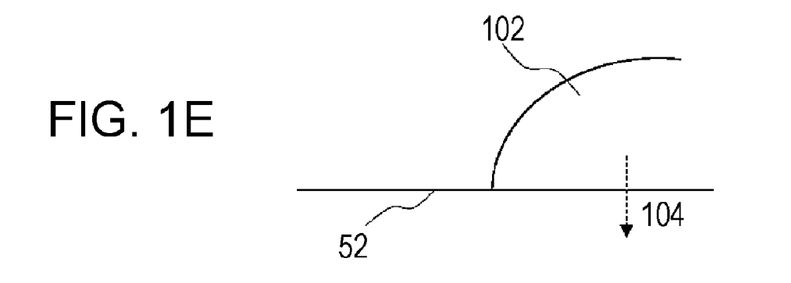
Figure 1F:
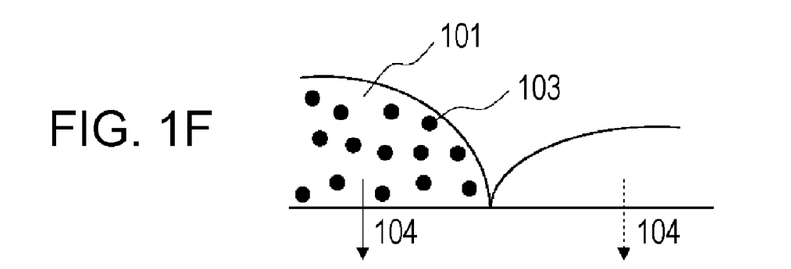
Figure 1G:
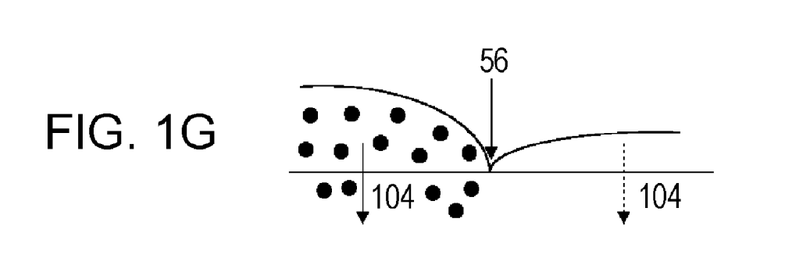
Figure 1H:
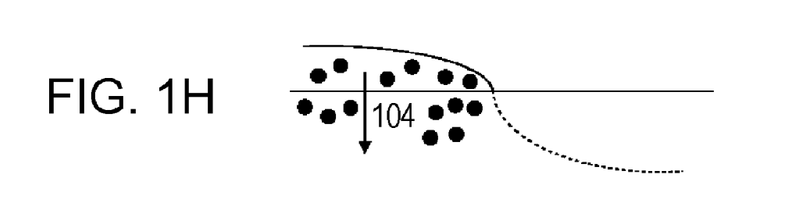
Figure 1I:
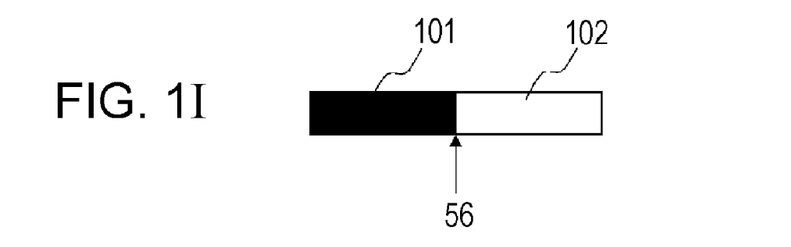

The ink permeation process when color inks were applied before the black ink will now be described with reference to FIGS. 1E to 1H. As shown in FIG. 1E, a yellow ink having high brightness was applied first; and then a black ink having low brightness was applied next, as shown in FIG. 1F. Since there was only a small difference in surface tension between the black ink (Bk1) 101 and the yellow ink (Y1) 102, it can be assumed that the inks slowly permeated into the recording medium 52 with little ink movement at the interface (see FIGS. 1G and 1H). FIG. 1I is a diagram showing the boundary portion 56 at which the black ink (Bk1) 101 contacted the yellow ink (Y1) 102. Since the physical properties of the black ink (Bk1) 101 were substantially the same as those of the yellow ink (Y1) 102, permeation was completed without having the inks, remaining as liquids on the recording medium surface, mixing with each other at the boundary portion 56.

Figure 3A:
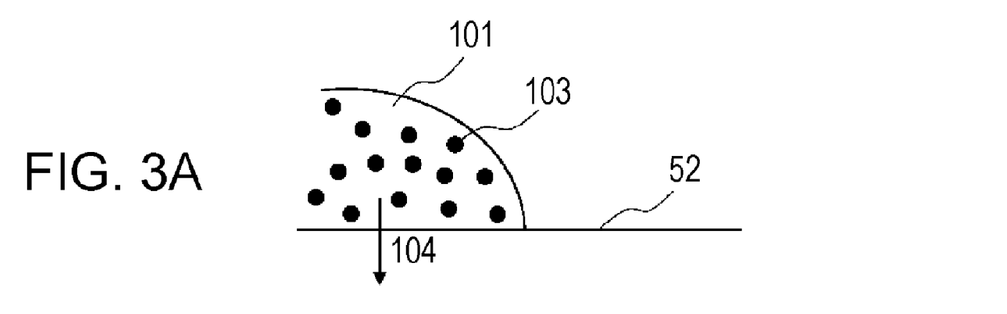
FIGS. 3A to 3C and 3E to 3H are schematic diagrams in chronological order showing a permeation process of a black ink and a yellow ink of Comparative Example 1 on a recording medium.

The ink permeation process of comparative Example 1 in which the black ink was applied on the paper before the color inks in 1-scan delay printing will now be described with reference to FIGS. 3A to 3D. In Comparative Example 1, the surface tension of Yellow ink 5 (Y5) with highest brightness was equal to the surface tension of other color inks. The difference in surface tension between Black ink (Bk5) and Yellow ink (Y5) was as large as 5 dyn/cm (mN/m). When the black ink 101 was applied on the recording medium 52, the black ink 101 having low permeability covered the recording medium 52, as illustrated in FIG. 3A. The black ink 101 contained pigment particles 103.

Figure 3B:
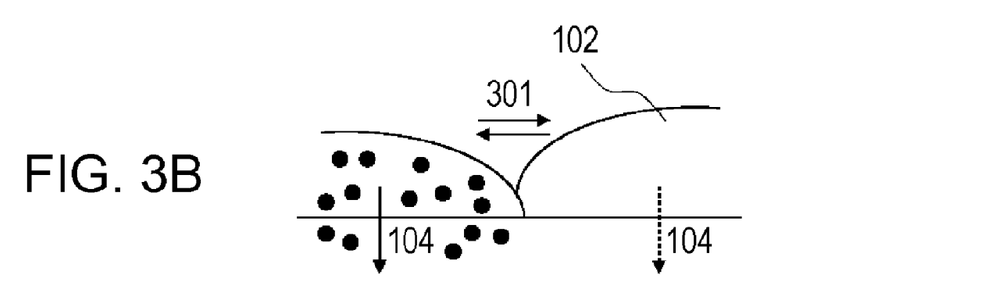
Figure 3C:
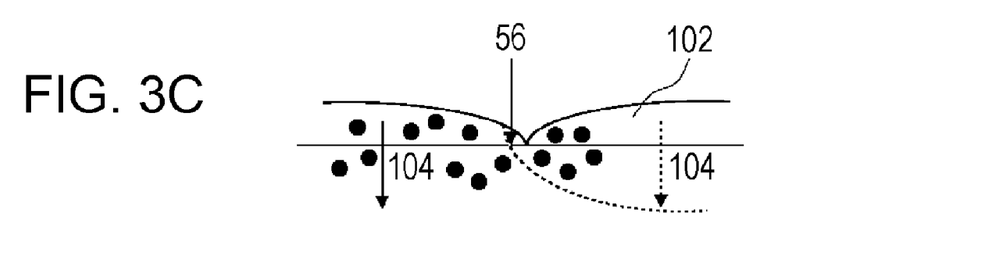

Under such a condition, since the black ink 101 had low permeability into the recording medium 52, the black ink 101 permeated into the recording medium 52 slowly. Subsequently, the yellow ink 102 having high permeability was applied (FIG. 3B). Since the difference in surface tension between the black ink 101 and the yellow ink 102 was large, it is assumed that permeation into the recording medium 52 occurred while the inks moved vigorously (indicated as 301 in the drawing) at the interface between the black ink and the yellow ink (FIG. 3C).

Figure 3D:
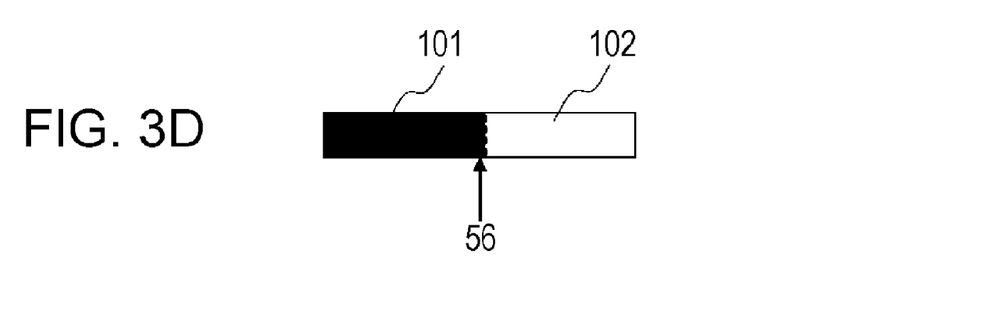
FIGS. 3D and 3I are diagrams showing boundary portions between the black ink and the yellow ink of Comparative Example 1 as viewed from above the recording medium.

FIG. 3D is a diagram of the boundary portion 56 between the black ink 101 and the yellow ink 102 viewed from above. Since the difference in physical properties between the black ink 101 and the yellow ink 102 was large, the inks remaining as liquids on the recording medium became mixed with each other at the boundary portion 56, thereby resulting in extensive bleeding. Bleeding at the boundary portion 56 was also extensive when the color ink was applied on the paper before the black ink. The ink permeation process will be described with reference to FIGS. 3E to 3I.

Figure 3E:
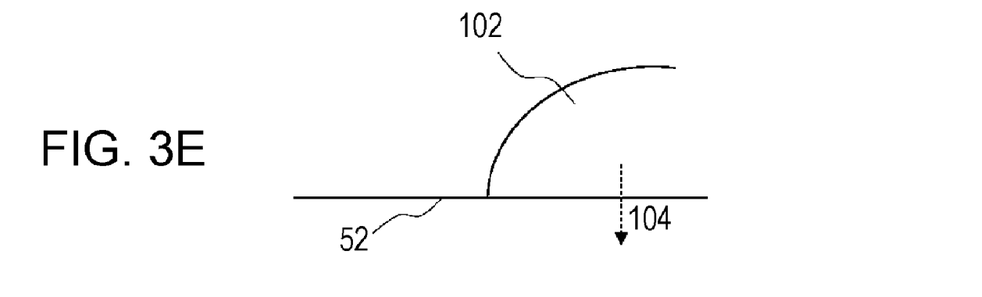
Figure 3F:
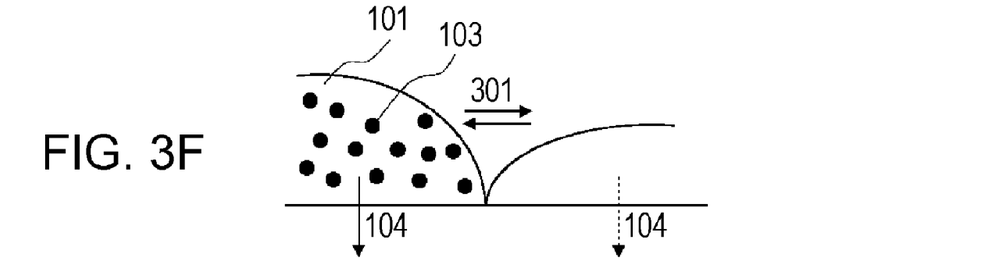
Figure 3G:
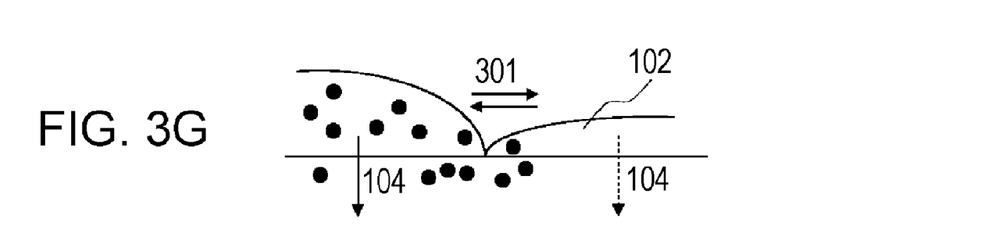
Figure 3H:
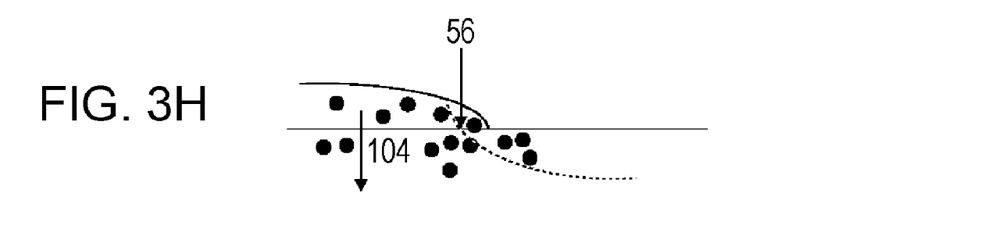
Figure 3I:
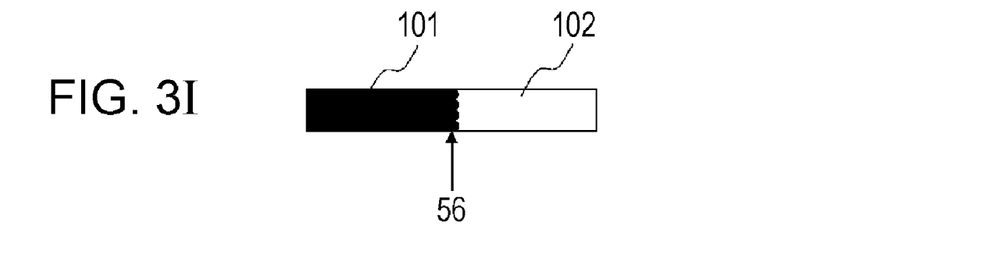

First, as shown in FIG. 3E, an yellow ink having high brightness was applied; and then a black ink having low brightness was applied, as shown in FIG. 3F. Since the difference in surface tension between the black ink 101 and the yellow ink 102 was large, it can be assumed that permeation into the recording medium 52 occurred while the inks moved vigorously (indicated as 301 in the drawing) at the interface between the black ink and the yellow ink (FIGS. 3G and 3H). FIG. 3I is a diagram of the boundary portion 56 between the black ink 101 and the yellow ink 102 as viewed from above. Since the difference in physical properties between the black ink 101 and the yellow ink 102 was large, the inks remaining as liquids on the recording medium became mixed with each other at the boundary portion 56, thereby resulting in extensive bleeding.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-051884, filed Mar. 1, 2007, which is hereby incorporated by reference herein in its entirety.

What is claimed is:

1. An ink set for ink jet recording comprising:

a black ink; and a plurality of color inks of different colors, wherein the black ink contains a pigment as a coloring material, wherein the color ink having the highest brightness among the plurality of color inks has the highest surface tension among the plurality of color inks, wherein a difference in surface tension between the black ink and the color ink having the highest brightness is 2 dyn/cm (mN/m) or less, wherein the color ink having the highest brightness is a yellow ink, wherein the black ink contains at least one salt selected from the group consisting of $(M1)_2SO_4$, $CH_3COO(M1)$, $Ph\text{-}(COO(M1))_n$, $(M1)NO_3$, $(M1)Cl$, $(M1)Br$, $(M1)I$, $(M1)_2SO_3$, and $(M1)_2CO_3$, where M1 represents an alkali metal, ammonium, or organic ammonium, Ph represents a benzene ring, and n represents 1 or 2, and wherein a surface tension of the yellow ink is lower than the surface tension of the black ink.

2. The ink set according to claim 1, wherein the pigment is a self dispersion carbon black.

3. The ink set according to claim 1, wherein a difference in surface tension between the color ink having the highest brightness and a color ink having the lowest surface tension is 4 dyn/cm (mN/m) or less.

4. The ink set according to claim 1, wherein the surface tension of the black ink is 39 dyn/cm (mN/m) or more and 40 dyn/cm (mN/m) or less.

5. An ink jet recording method using the ink set according to claim 1, the method comprising:

applying the black ink and one of the plurality of color inks on a recording medium so that the black ink contacts the one color ink.

6. The ink jet recording method according to claim 5, wherein one of the black ink and the one color ink is ejected before the other, and the one ejected before the other remains as a liquid on the recording medium at the time of contact between the black ink and the color ink on the recording medium.

7. The ink jet recording method according to claim 5, wherein the interval between application of the black ink on the recording medium and application of the color ink on the recording medium is 1 second or less.

8. The ink jet recording method according to claim 5, wherein the black ink and the color ink are applied on the recording medium in one scan operation of a recording head.

9. The ink jet recording method according to claim 5, wherein one ink droplet of the ejected black ink weighs 30 ng or less.

\* \* \* \* \*